B. G. BRAINE.
INSULATED RAIL JOINT.
APPLICATION FILED JULY 10, 1916.
1,207,131.
Patented Dec. 5, 1916.
2 SHEETS—SHEET 1.
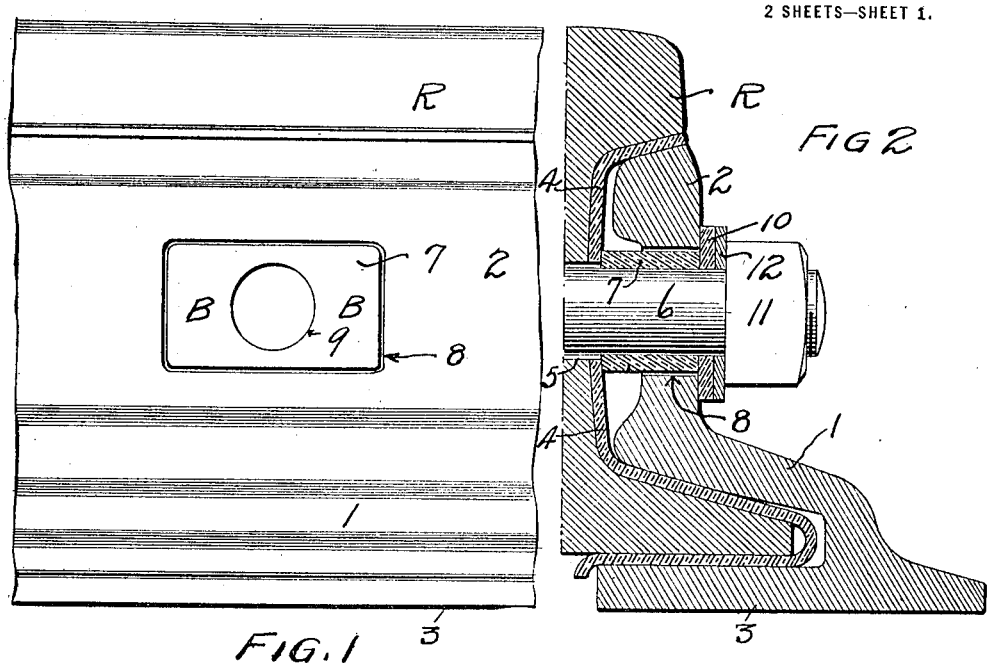
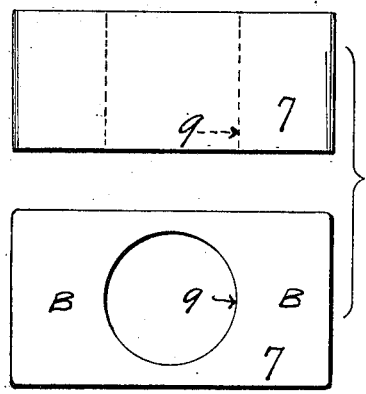
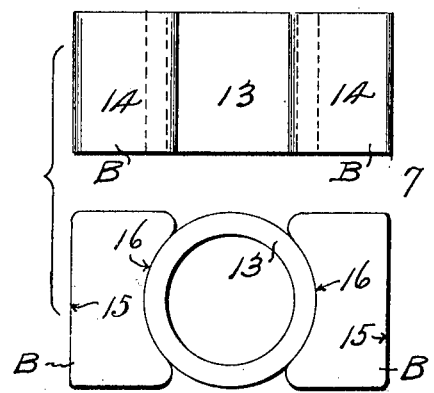
Inventor
BANCROFT G. BRAINE
By
Attorney

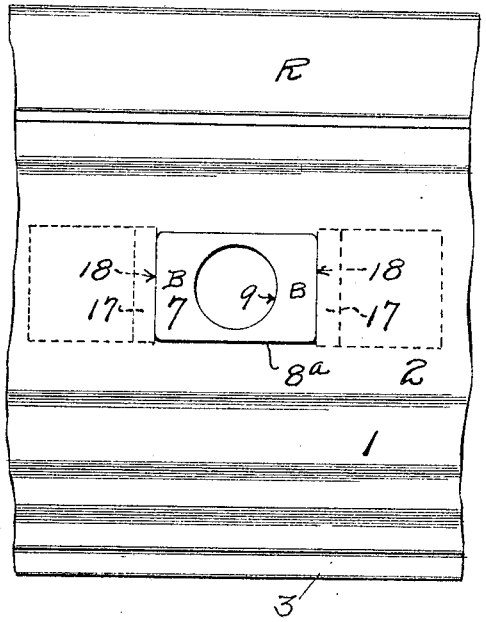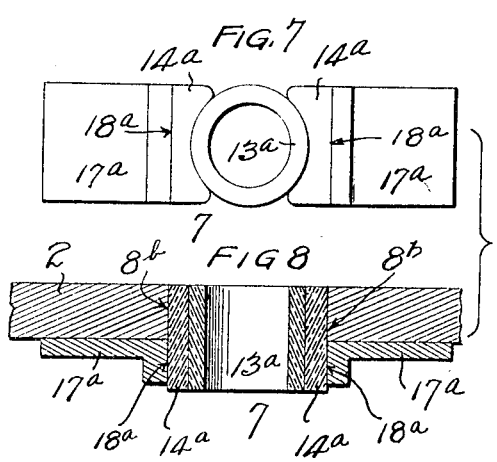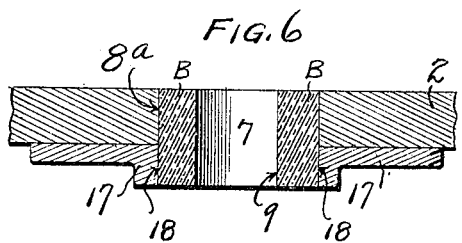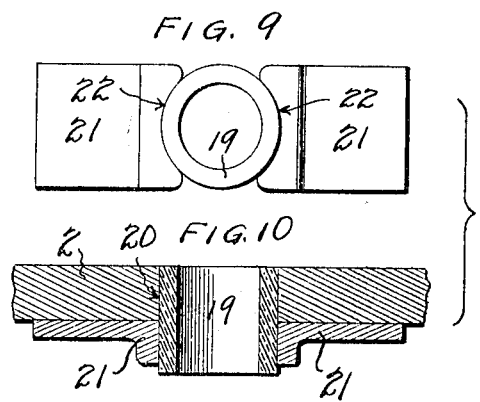

UNITED STATES PATENT OFFICE.

BANCROFT G. BRAINE, OF NEW YORK, N. Y., ASSIGNOR TO THE RAIL JOINT COMPANY, A CORPORATION OF NEW YORK.

INSULATED RAIL-JOINT.

1,207,131.  Specification of Letters Patent.  Patented Dec. 5, 1916.

Application filed July 10, 1916. Serial No. 108,433.

*To all whom it may concern:*

Be it known that I, BANCROFT G. BRAINE, a citizen of the United States, residing at New York city, in the county of New York and State of New York, have invented certain new and useful Improvements in Insulated Rail-Joints, of which the following is a specification.

This invention relates to rail joints of the insulated type, and has particular reference to a novel improvement in insulating the bolts from the joint bars.

In practice it has been found that the fiber ferrules now in general use in insulated rail joints for bolt insulation frequently wear out or cut out much more quickly than the other fiber parts of the joint, owing to the pressure thereon, partly due to the creeping or longitudinal movement of the rails, and partly due to other conditions and causes. It is, therefore, highly desirable to provide efficient means whereby the life of the bolt insulation may be increased, since the removal and replacing of the usual relatively thin fiber ferrules or sleeves not only requires a dismantling of the joint, but also involves much labor and expense, hence being more or less objectionable.

Accordingly, the present invention contemplates a novel construction wherein the bolts are effectually insulated from the joint bars, and at the same time the bolt insulation is so constructed and arranged that reinforced or heavy portions thereof take the lateral wearing stress from the rails, and thus materially increase the life of the insulation. Furthermore, the present invention provides bolt insulation which is more readily applied than the ordinary fiber ferrule or sleeve, and has a much greater capacity for withstanding severe service conditions.

With the above and other objects in view which will more readily appear as the nature of the invention is better understood, the same consists in the novel construction, combination and arrangement of parts hereinafter more fully described, illustrated and claimed.

Preferred and practical embodiments of the invention are shown in the accompanying drawings, in which, Figure 1 is a detail elevational view of a portion of a joint bar applied to a rail, showing the improved insulating unit in position in the joint bar, the bolt being removed. Fig. 2 is a bi-sected vertical sectional view taken on the line of one of the bolts of the joint, and showing the improved insulating unit shown in Fig. 1 in position. Fig. 3 is a composite view embodying plane and elevational views of the insulating unit shown in Figs. 1 and 2. Fig. 4 is a view similar to Fig. 3 showing a modified form of the insulating unit. Fig. 5 is a view similar to Fig. 1 showing a modified construction whereby the larger bearing surface is provided for the insulating unit. Fig. 6 is a horizontal section of the construction shown in Fig. 5. Fig. 7 is a detail elevation of another modification of the invention. Fig. 8 is a horizontal sectional view of the construction shown in Fig. 7. Fig. 9 is a detail elevational view of a further modification of the invention. Fig. 10 is a horizontal sectional view of the construction shown in Fig. 9.

Similar references designate corresponding parts throughout the several figures of the drawings.

In carrying the present invention into effect it is proposed to utilize a joint bar 1 of the continuous type, which includes the upright web 2 and base member 3, and which is insulated from the rail R by means of the insulation 4. As usual, the rail R is provided with the bolt holes 5 for receiving the bolts 6, and each of the latter is insulated from the web of the joint bar by a novel insulating unit 7.

As will be observed from Fig. 1, the web 2 of the joint bar is not provided with the conventional round bolt hole, but is formed with an opening 8, in the present instance rectangular, for receiving the insulating unit 7, above referred to. This unit, as shown in Fig. 2, comprises a relatively thick body of insulating material extending through the web of the bar. The body portion of this insulating unit is provided with a central bolt hole 9 for receiving the bolt 6, and owing to the relatively oblong shape of the body of insulating material, the location of the bolt hole at this point provides the buffer sections B of insulation at each side of the bolt where the greatest wear takes place. That is to say, the insulating unit 7, which fits in the rectangular opening 8, has its greatest thickness of material at each side of the bolt hole between the latter and the short sides of the opening 8, so that the longitudinal or endwise movement of the rails transmitted to the bolts will have a relatively large bearing on the buffer section B of the insulation, at the ends of the unit. For the purpose of more completely safeguarding the insulation of the bolt from the web of the joint bar, the face of the insulating unit 7 may be covered with an insulating washer 10, and between the nut 11 and the washer 10 may be interposed the usual metal washer 12, as shown in Fig. 2.

It will now be seen that a novel and distinctive feature of the present invention is that of providing an increased body of insulation at the sides of the bolt where the greatest wear takes place, due to the longitudinal movement of the rails, and to effectually provide for the complete insulation of the bolts from the joint bars for a much greater length of time than would be possible with the ordinary thin ferrule or sleeve now commonly used.

Another means of carrying forward the invention is suggested in Fig. 4, wherein the insulating unit 7 comprises a ferrule or sleeve 13 and the opposite removable wear sections or blocks 14. These wear sections are duplicates, and have a flat side 15 for engaging with the end of the opening in the splice bar, and a curved side edge 16 for receiving the periphery of the ferrule, as shown in Fig. 4. In using this construction, it will be apparent that the insulation blocks 14 have a cushioning effect, which materially lengthens the life of the ferrule 13, and in case the joint has been subjected by the rails to pressure in one direction more than another due to continuous traffic in the same direction, the block 14 that is most worn may be easily removed and a fresh one substituted therefor, without disturbing the arrangement of the insulating members of the rest of the unit. This construction of units also requires a rectangular hole in the splice bar.

Figs. 5 and 6 of the drawings illustrate an insulating unit 7 of substantially the same character as shown in Fig. 1. In this form of the invention, the insulating unit 7 fits into the rectangular opening 8ª in the web 2 of the joint bar 1 and extends rearwardly beyond the inner face of the web 2, as clearly shown in Fig. 6, and to support the portions of the unit projecting beyond the inner face of the web, there is provided at each side of the bolt hole a suitable metallic abutment element 17. These abutment elements are preferably rigidly carried by the inner face of the web of the joint bar and have their abutment edges 18 in alinement with the inner end edges of the opening 8ª, thus providing an enlarged bearing surface for the ends of the unit 7, at the inside face of the bar whereby the integral buffer sections B at each end thereof will have a uniform bearing and support to resist the longitudinal movement of the bolts due to the movement of the rails. These elements 17 may be welded or otherwise rigidly positioned.

In Figs. 7 and 8, there is shown a construction similar to that shown in Fig. 4, wherein the insulating unit 7 comprises a ferrule 13ª and the opposite buffer sections or blocks 14ª, which fit into a rectangular opening 8ᵇ in the web 2 of the splice bar, and project beyond the inner face of the latter, similar to the unit shown in Fig. 6. As in the construction shown in the latter figure, the joint bar is provided on its inner face with the abutment elements 17ª having the abutment shoulders 18ª for contacting with the flat sides of the insulation blocks 14ª arranged on opposite sides of the ferrule 13ª. In this case the insulation bearing is reinforced through the provision of the abutments 17ª.

A further modification of the invention, carrying out the distinctive feature thereof, namely, an extended bearing for the bolt hole insulation, whereby the life of the same is increased, is shown in Figs. 9 and 10, wherein a round ferrule or sleeve 19 is employed and fits in a round opening 20 in the web 2 of the splice bar. On one face of the web adjacent the bolt hole 20 are provided the rigid abutment members 21 having the curved socket portions 22 registering with the said edges of the bolt hole 20, and coöperating therewith to form an extended bearing surface and buffer reinforcement for the ferrule of insulation.

From the foregoing it will be apparent that the invention has in view, in all forms thereof, the provision of fiber insulation that surrounds the bolts in such a manner that the life and efficiency thereof may be materially increased, and to this end utilizes an insulating unit having the greatest capacity for absorbing stresses and wear at each side thereof through the provision of enlarged sections of insulation, or through the provision of additional support for the usual insulation, as suggested in Figs. 9 and 10.

Without further description it is thought that the many novel and important features of the present invention will be apparent, and it will, of course, be understood that various changes in the form, proportion and minor details of construction may be resorted to without departing from the spirit of the invention or the scope of the appended claims.

I claim:

1. An insulated rail joint including in combination with the rails and joint bolts, a splice bar having an opening, and an insulation unit fitting said opening and having buffer reinforcements at the sides thereof.

2. An insulated rail joint including in combination with the rails and joint bolts, a splice bar having an opening, and an insulation unit fitting said opening and having lateral buffer portions of insulation.

3. An insulated rail joint including in combination with the rails and the joint bolts, a splice bar having an oblong opening, an insulation unit fitting said opening and having a bolt receiving opening and enlarged buffer sections of insulation at the opposite ends thereof.

4. An insulated rail joint including in combination with the rails and joint bolts, a splice bar having a rectangular opening, an insulating unit fitting in said opening and having a central bolt hole, said insulating unit having its greatest thickness at opposite ends thereof.

5. An insulated rail joint including in combination with the rails and joint bolts, a splice bar having an opening, and an insulating unit fitting in said opening, said unit comprising an insulating ferrule, and separate duplicate blocks of insulation adapted to be interposed between the sides of said ferrule and the sides of said opening.

In testimony whereof I hereunto affix my signature.

BANCROFT G. BRAINE.

Copies of this patent may be obtained for five cents each, by addressing the "Commissioner of Patents, Washington, D C."